United States Patent
Martinez et al.

(10) Patent No.: US 9,280,918 B2
(45) Date of Patent: Mar. 8, 2016

(54) MACHINE THAT SIMULATES THE MOVEMENT PRODUCED DURING TRANSPORT

(75) Inventors: Manuel-Alfredo Garcia-Romeu Martinez, Valencia (ES); Juan Alcaraz Llorca, Valencia (ES); Amparo Martinez Giner, Valencia (ES); Enrique De La Cruz Navarro, Valencia (ES); Patricia Navarro Javierre, Valencia (ES); Javier Zabaleta Meri, Valencia (ES)

(73) Assignee: Instituto Tecnologico Del Embalaje Transporte Y Logistica, Valencia (ES)

( * ) Notice: Subject to any disclaimer, the term of this patent is extended or adjusted under 35 U.S.C. 154(b) by 247 days.

(21) Appl. No.: 14/003,308

(22) PCT Filed: Mar. 8, 2012

(86) PCT No.: PCT/ES2012/070153
§ 371 (c)(1),
(2), (4) Date: Nov. 6, 2013

(87) PCT Pub. No.: WO2012/120178
PCT Pub. Date: Sep. 13, 2012

(65) Prior Publication Data
US 2014/0057245 A1    Feb. 27, 2014

(30) Foreign Application Priority Data
Mar. 8, 2011    (ES) .................................. 201130308

(51) Int. Cl.
*B06B 3/00*    (2006.01)
*G09B 25/02*    (2006.01)
(Continued)

(52) U.S. Cl.
CPC ............. *G09B 25/025* (2013.01); *G01M 7/027* (2013.01); *G01M 7/06* (2013.01)

(58) Field of Classification Search
CPC .......... G09B 25/025; G09B 9/12; G09B 9/00; G09B 9/02; G01M 7/027; G01M 7/06; A47C 3/02; A63B 2024/0031
See application file for complete search history.

(56) References Cited

U.S. PATENT DOCUMENTS 3,577,655 A  *  5/1971  Pancoe ..................... G09B 9/14
                                                    269/12
3,645,011 A  *  2/1972  Callanen .................. G09B 9/14
                                                    434/58

(Continued)

FOREIGN PATENT DOCUMENTS

EP    1755095    2/2007
EP    1887338    2/2008

(Continued)

*Primary Examiner* — Laura Martin
*Assistant Examiner* — Samir M Shah
(74) *Attorney, Agent, or Firm* — Sturm & Fix LLP

(57) ABSTRACT

The invention relates to a machine that simulates movement during transport, for the testing of packaging elements. The machine comprises: a load platform (1), the lower part of said platform having attached thereto a plurality of upper ball joints (3, 61,71) with a ±30° rotation angle, coplanar with the axis of rotation of a rotating support (5, 5', 5"); and a lower platform (6) which is located opposite the load platform (1) and which is provided with anchors for attaching same to a vertical vibration table (25,26). Additionally, a central support (7) is located between the load platform (1) and the lower platform (6). Furthermore, a plurality of mutually independent hydraulic servo-actuators (8,8',8") are attached between the upper spherical ball joints (3) and the lower ball joints (4), said servo-actuators (8,8',8") being placed along two perpendicular planes that pass through the center of the rotating support (5, 5', 5"), forming a 90° angle.

8 Claims, 5 Drawing Sheets

(51) Int. Cl.
*G01M 7/02* (2006.01)
*G01M 7/06* (2006.01)

(56) References Cited

U.S. PATENT DOCUMENTS

| | | | | |
|---|---|---|---|---|
| 4,753,596 A | * | 6/1988 | Hart | G09B 9/14 434/29 |
| 5,009,412 A | * | 4/1991 | Roodenburg | A63G 31/00 472/136 |
| 5,176,518 A | * | 1/1993 | Hordijk | G09B 9/14 434/37 |
| 5,347,811 A | * | 9/1994 | Hasegawa | E02F 9/2225 60/426 |
| 5,366,375 A | * | 11/1994 | Sarnicola | G09B 9/12 434/29 |
| 5,669,773 A | * | 9/1997 | Gluck | G09B 9/02 434/29 |
| 5,752,834 A | * | 5/1998 | Ling | G09B 9/12 434/55 |
| 6,027,342 A | * | 2/2000 | Brown | G09B 9/14 434/55 |
| 6,586,854 B1 | * | 7/2003 | Nozawa | G09B 9/04 310/83 |
| 6,619,960 B1 | * | 9/2003 | Horn | G09B 9/10 434/37 |
| 6,634,885 B2 | * | 10/2003 | Hodgetts | G09B 9/12 434/29 |
| 6,902,405 B2 | * | 6/2005 | Irion | G05G 9/047 434/262 |
| 6,964,614 B1 | * | 11/2005 | Tsai | A63B 26/003 434/247 |
| 7,115,039 B2 | * | 10/2006 | Matsuda | A63F 13/12 348/E7.063 |
| 8,298,845 B2 | * | 10/2012 | Childress | A63F 13/08 438/46 |
| 8,355,897 B2 | * | 1/2013 | Morali | G09B 9/12 434/28 |
| 8,403,673 B2 | * | 3/2013 | Atluri | G09B 9/14 434/55 |
| D737,870 S | * | 9/2015 | Houston | G09B 9/14 D15/122 |
| 2004/0092308 A1 | * | 5/2004 | Lim | A47C 3/02 463/30 |
| 2006/0128489 A1 | * | 6/2006 | Mooney | A63B 24/0021 473/139 |
| 2007/0059668 A1 | * | 3/2007 | Mallaci | G09B 9/00 434/29 |
| 2008/0286726 A1 | * | 11/2008 | Bennett | G09B 9/02 434/29 |
| 2010/0266994 A1 | * | 10/2010 | Gregoire | G09B 9/00 434/55 |

FOREIGN PATENT DOCUMENTS

| | | | |
|---|---|---|---|
| ES | 2154658 | 4/2001 | |
| GB | 2378687 | 2/2003 | |
| GB | 2378687 A | * 2/2003 | ............... G09B 9/04 |
| GB | 2449214 | 11/2008 | |
| WO | 02102200 | 12/2002 | |
| WO | 2010058632 | 5/2010 | |

* cited by examiner

MACHINE THAT SIMULATES THE MOVEMENT PRODUCED DURING TRANSPORT

The technical field of the invention herein relates to machines that perform three dimensional movements in order to reproduce tilt conditions and random vibrations in the laboratory that occur during the transportation of goods.

STATE OF THE PRIOR ART

There are machines and/or devices that use servo-actuators having various arrangements and coupling elements to reproduce the movements of the means of transport (vehicles on land, sea and air). There are machines that only reproduce a longitudinal movement (vertical vibration tables with a single actuator), machines that reproduce three longitudinal and orthogonal movements between each other (vibration tables in three orthogonal axes with three actuators), machines that reproduce an angular movement (vibration tables with one actuator), machines that reproduce an angular movement in two orthogonal directions (vibration tables with two actuators) and machines that reproduce movements in all longitudinal and angular directions (vibration tables with three or more actuators).

Typical movements made by these means of transport and that affect how the products and their containers and packaging behave when transported are the vertical vibrations produced by the vehicle suspension system and the pitch and roll vibrations or movements. Currently, there are vibration tables that simultaneously reproduce these three movements, but do so with three or more actuators, being very costly and having very complex motion controllers due to the movements of the axes not acting independently of each other because of the design and arrangement thereof.

Document WO2010058632 describes a hydraulic actuator and a machine to conduct vibration tests, being provided with a hydraulic pump and a hydraulic cylinder unit. However, they only move in one direction (vertical vibrations). On the other hand, document ES2154658 describes a vibrating device that consists of a support device or mould, a cylinder for applying vibrations, a hydraulic unit for supplying hydraulic fluid to the cylinder and a control unit for supplying an actuating signal to an actuation section of the cylinder. The aforementioned cylinder is composed of a servomechanism. However, there is only one cylinder to mechanically vibrate a mould in the continuous casting processes generating vibrations and movements in a single plane.

The European patent no. EP 1887338 is also known, which describes a test apparatus for transporting packaging that performs three-dimensional vibratory movements by using springs. However, the movements made by this device cannot be controlled in all different directions such that simulation does not fully conform to a real-life situation. The Spanish patent number ES 2154658 describes a vibrating device that essentially consists of a support device for a mould and a cylinder for applying vibrations only, without the possibility of performing the multiple movements obtained by using the machine of the invention herein.

DISCLOSURE OF THE INVENTION

To alleviate the above problems, the machine for simulating movement produced during transport is presented, that can be used to simulate how products and/or packaging behave, characterised in that it uses two hydraulic servo-actuators that control the movement of the load plane of the machine, the movement of said plane being restricted by a gimbal, such that it can only tilt relative to the anchor point, but does not allow the movement of said point. The plate can perform rotational movements on its two orthogonal angular reference axes at the aforementioned anchor point by means of a gimbal system. The servo-actuators are arranged along two perpendicular planes that pass through the centre of the gimbal. This 90° angle arrangement, being displaced from the centre and making the centres of the upper ball joints of both servo-actuators coincide with the centre of the gimbal, mean the movements in each servo-actuator act independently of the other, such that the motion device is simpler and the cost of the machine is less than existing motion simulators referred to in the prior art.

Another novelty is that the machine is designed to be installed on any single axis vertical vibration table, already available on the market, which would be a vibration table that reproduces the roll and pitch at the same time the vertical vibration is being reproduced, with the resulting savings this represents by not having to purchase an additional table comprising three or more servo-actuators.

In order to simulate movements up to 15° simultaneously in both pitch and roll movements, spherical ball joints that can reach over 22° without reaching their mechanical limits have been designed. In order to prevent the actuator of the vertical vibration table, on which the machine is installed, from bearing excess strain due to the momentum the pitch and roll movement can cause, stiffening means were included that, when installed on the vertical vibration table, without restricting its vertical movement, accorded a certain stiffness in the other directions, thereby dividing this load within the system.

The design of the actuators can be either hydraulic or electrical, although the hydraulic actuators have greater advantages and if the machine of the invention is installed on a hydraulic vertical vibration table, the existing hydraulic source for powering the servo-actuators of the machine of the invention can be used without having to purchase another hydraulic source at the cost that this entails.

The machine supports multiple practical embodiments wherein different coupling elements are used whose configuration enables the proper operation thereof.

Throughout the description and claims the word "comprise" and its variants do not intend to exclude other technical characteristics, addends, components or steps. For the skilled in the art, other objects, advantages and characteristics of the invention will be apparent partly from the description and partly from implementing the invention. The following examples and drawings are provided by way of illustration, and are not intended to be limiting of the present invention. Furthermore, this invention covers all possible combinations of particular and preferred embodiments set forth herein.

PREFERRED EMBODIMENT OF THE INVENTION

Figure 1:
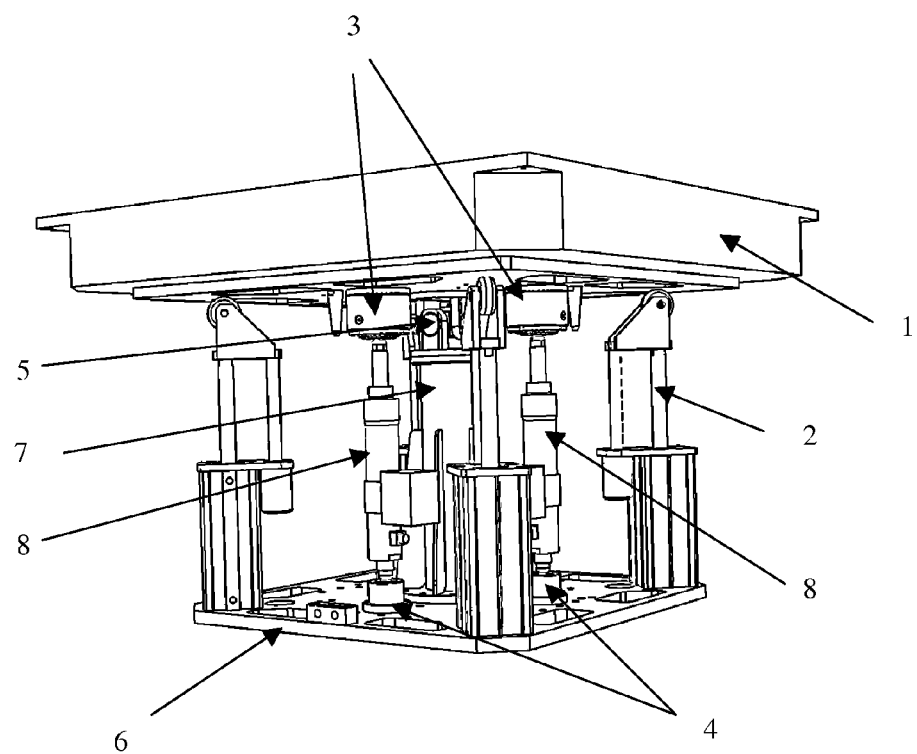
FIG. 1. Shows a full view of the machine of the invention.

As shown in FIG. 1, the machine for simulating movement produced during transport that can be used to simulate how products and/or packaging behave, which is the object of the present invention, consists of a load platform (1) where objects, packages or palletised loads to be tested are placed, on whose lower part both upper spherical ball joints (3), having a large ±30° rotation angle, coplanar to the gimbal rotational axis (5), are attached.

The lower platform (6), provided with a number of anchors for attachment to any vertical vibration table on the market (1), is opposite the load platform (1).

A central support (7), connecting both platforms, is located between the load platform (1) and the lower platform (6).

Similarly, two independent hydraulic servo-actuators (8) that generate pitch and roll movements on the upper load platform are integrally attached between the upper spherical ball joints (3) with a ±30° rotation angle, and the lower ball joints (4) with a ±15° rotation angle.

A plurality of pneumatic actuators (2) are integrated into the safety, locking and self-levelling means of the platform (6) on the lower platform (6) and integrally attached thereto, to manoeuver the level load on the load platform (1) when there is no hydraulic pressure in the hydraulic servo-actuators (8). The safety, locking and self-levelling means are shown in detail in FIG. 3.

Figure 2:
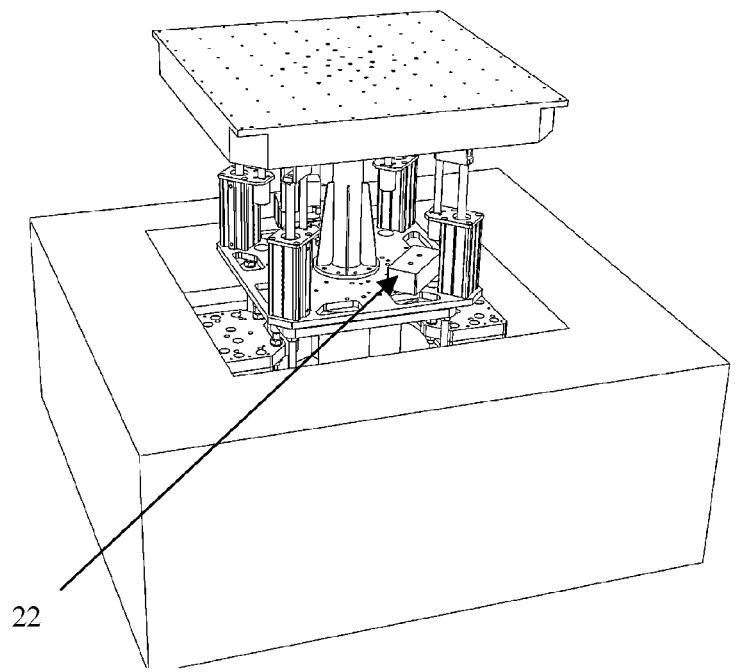
FIG. 2. Shows a view of the machine of the invention installed on a vertical vibration table.
Figure 2A:
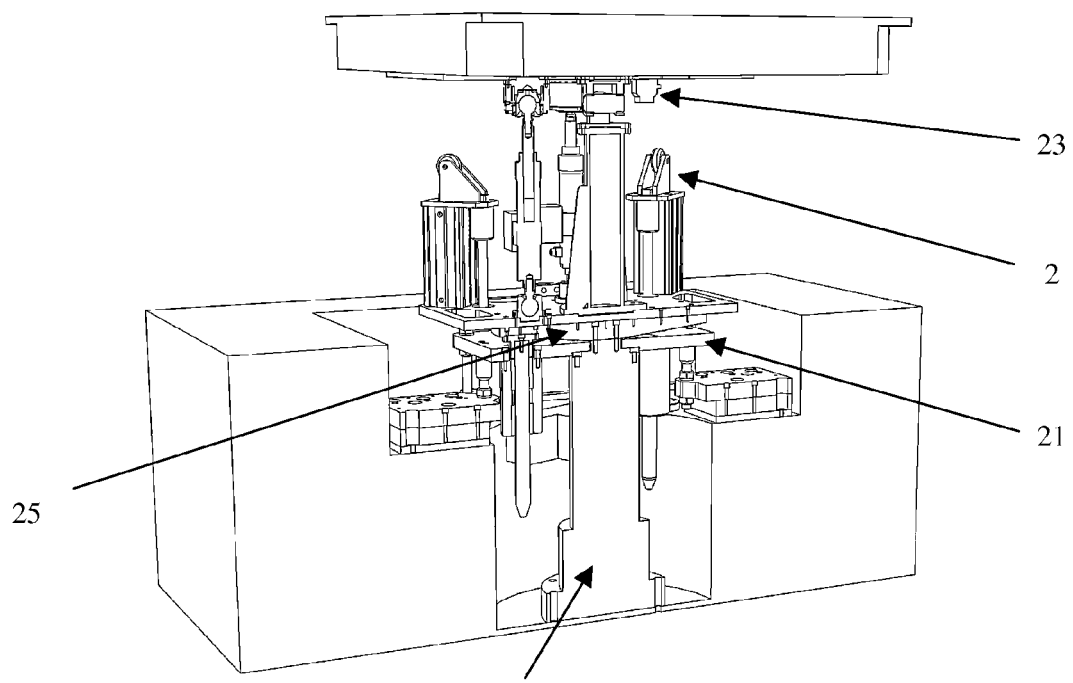
FIG. 2A shows a cross section of the view shown as FIG. 2.

FIG. 2 and FIG. 2a show a full view of the machine of the present invention installed on a vertical vibration table (25, 26). In this figure the stiffening means (21) that are configured to reduce the torque that supports the hydraulic servo-actuator (26) of the vertical vibration table on which the device is installed can be seen. These stiffening means (21) are shown in greater detail in FIG. 5.

The machine of the invention comprises a counterweight (22) located on the lower platform (6), said counterweight (22) being configured to maintain the centre of mass in the central axis of the system. Additionally, there is an inertial measurement unit (23), that measures the pitch and roll, integrally attached to the load platform (1).

FIG. 2a further shows both the platform of the vertical vibration table (25) and the hydraulic servo-actuator of the vertical vibration table (26). The figure further shows the pneumatic security, locking and self-levelling actuators (2) in a retracted position, ready to begin the test.

Figure 3:
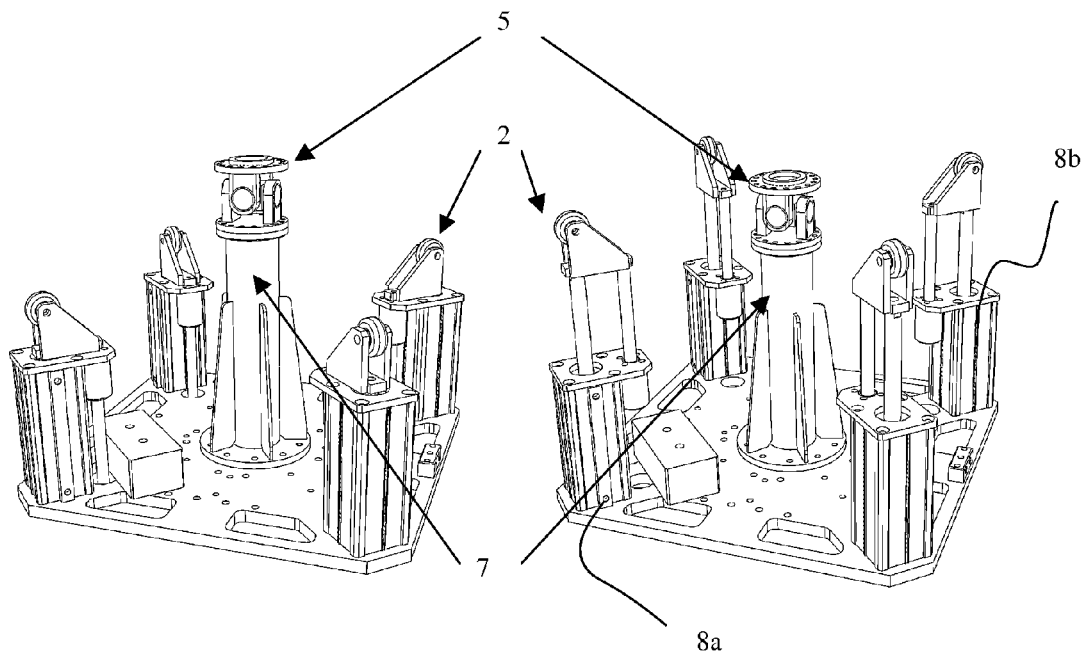
FIG. 3. Shows a detailed view of the security, locking and self-levelling means that form part of the machine of the present invention.

FIG. 3 illustrates the security, locking and self-levelling means, formed by a number of pneumatic actuators (2), whose primary function is to place the level load on the load platform (1) when there is no hydraulic pressure in the hydraulic servo-actuators (8), in whose preferred embodiment, the servo-actuator on the left (8a) is in a retracted position, ready to begin the test, and the servo-actuator on the right (8b) is in an extended position when there is no hydraulic pressure.

On the other hand, the gimbal (5) supports the weight of the system and maintains the centre of rotation of the load plane, enabling the roll and pitch rotation, but limits its rotation.

Figure 4:
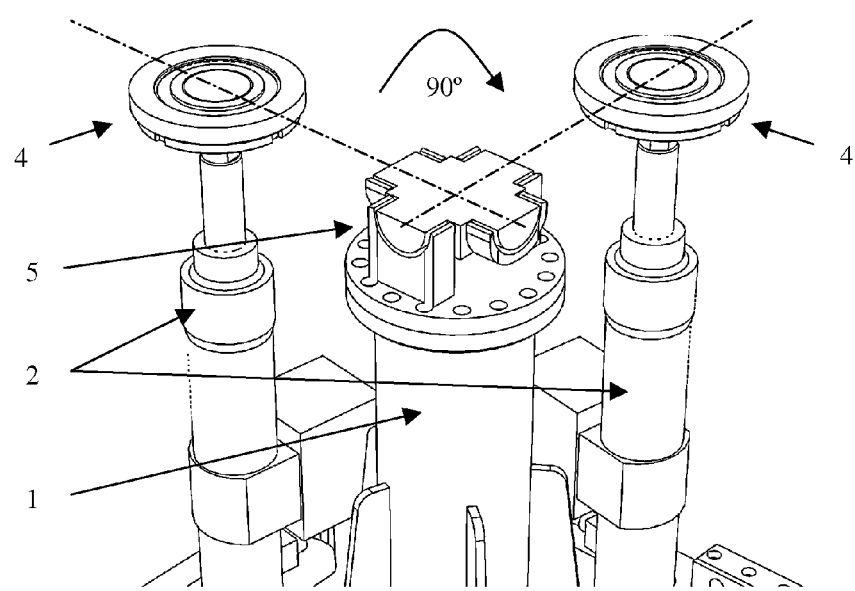
FIG. 4. Shows a detailed view of the movement of the machine of the present invention.

FIG. 4 shows how the movement occurs in the machine of the invention. The main parts that affect said movement are the central support (7), the hydraulic servo-actuators (8), that are responsible for generating the pitch and roll movements on the upper load platform (1); the gimbal (5) that supports the weight of the system and maintains the centre of rotation of the load plane enabling the pitch and roll rotation, but limiting its rotation; the upper spherical ball joints (3) with a ±30° rotation angle, coplanar with the rotation axis of the gimbal (5), and a lower spherical ball joint with a ±15° rotation angle. The servo-actuators (8) are arranged along two perpendicular planes that pass through the centre of the gimbal (5) forming a 90° angle.

Figure 5:
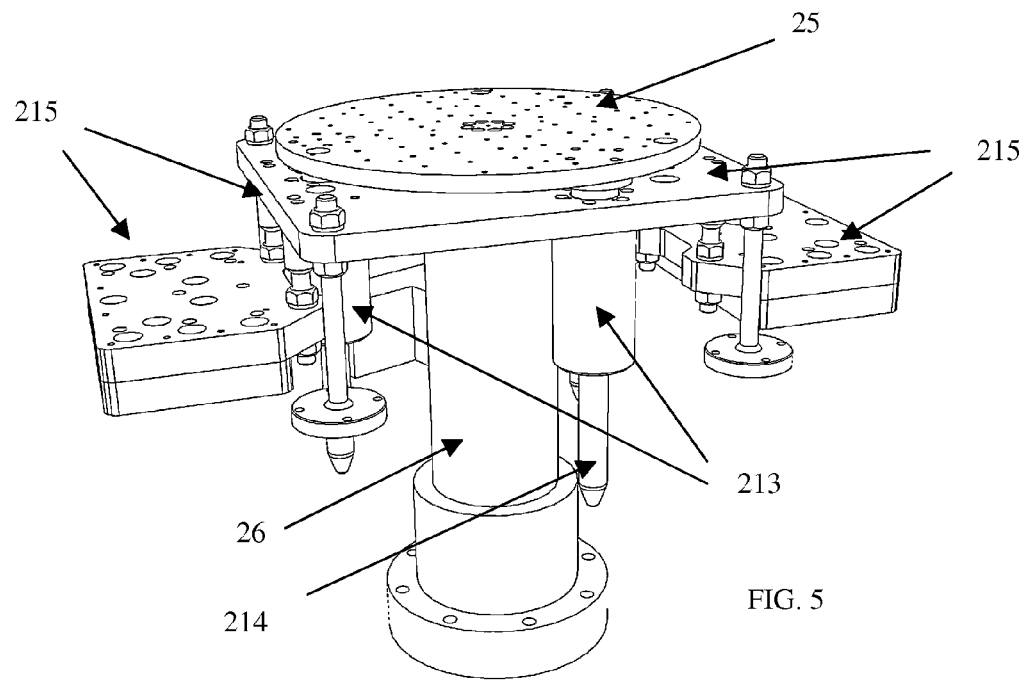
FIG. 5. Shows a detailed view of the stiffening means for reducing the torque that supports the hydraulic servo-actuator in the vertical vibration table on which the machine of the invention is installed.

FIG. 5 shows the stiffening means (21) configured to reduce the torque that supports the hydraulic servo-actuator (8) of the vertical vibration table (25,26) on which the device is installed.

Said stiffening means (21) comprise at least a plurality of low-friction bushings (213), integrally joined to a plurality of stiffening plates (215) that are configured to reduce the torque that supports the hydraulic servo-actuator of the vertical vibration table (25,26) which is installed on the machine and attached to the seismic mass of the vertical vibration table (25,26).

Finally, the stiffening means (21) also comprise a plurality of cylinders (214) attached to the platform of the vertical vibration table (25) and wherein said cylinders (214) increase the moment of inertia of the servo-actuator of the vertical vibration table (26).

Second Practical Embodiment of the Invention

Figure 6:
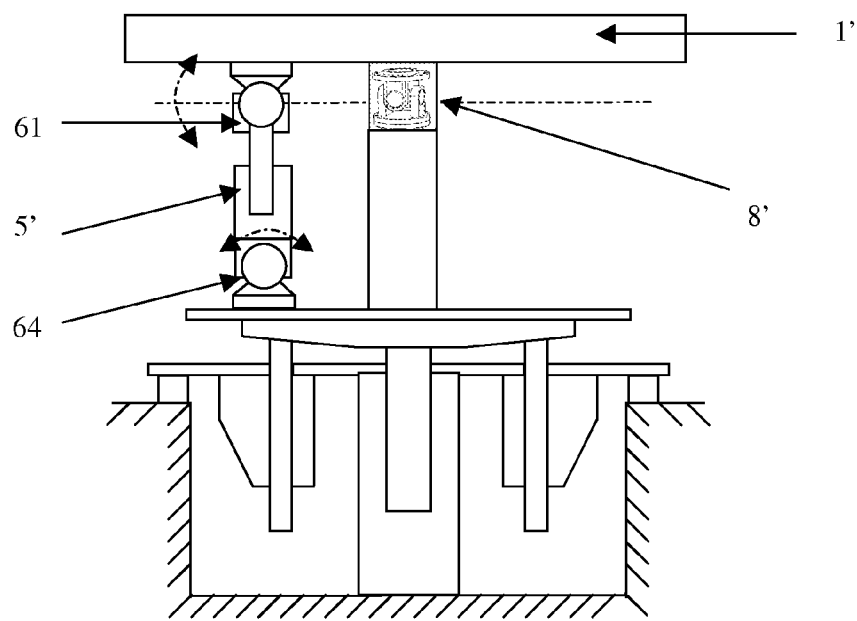
FIG. 6. Shows a schematic view of a second practical embodiment of the machine of the invention.

In a second practical embodiment, shown in FIG. 6, it can be seen how the independent hydraulic actuators (8') that generate pitch and roll movements of the upper load platform (1') being arranged (8') at a 90° angle with upper and lower spherical ball joints (61,64), while the gimbal (5') supports the weight of the assembly and maintains the centre of rotation of the load plane enabling the roll and pitch rotation, but limiting the rotation.

Third Practical Embodiment of the Invention

Figure 7:
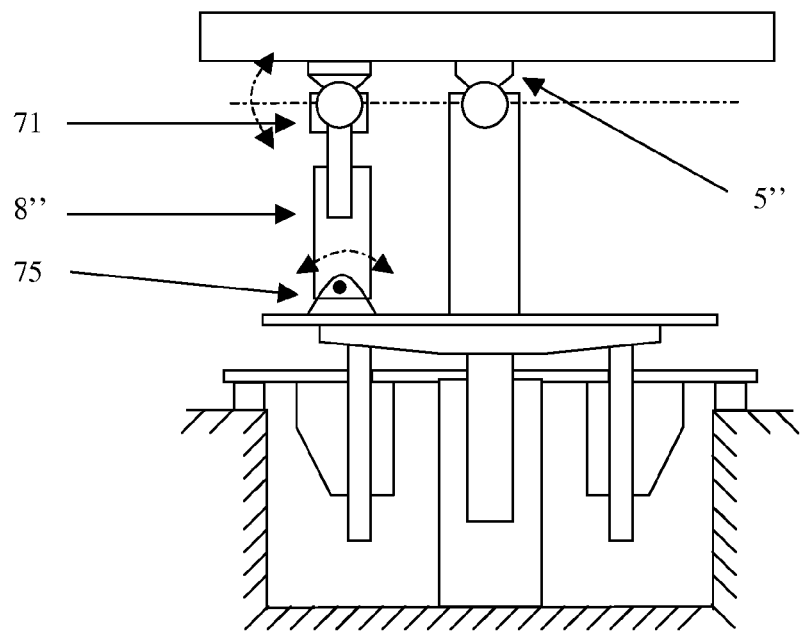
FIG. 7. Shows a schematic view of a third practical embodiment of the machine of the invention.

In a third practical embodiment, shown in FIG. 7, it can be seen how the actuators (8") comprise a ball joint (71), coplanar with the centre of a central spherical ball joint (5") on its upper part, that supports the weight of the assembly and maintains the centre of rotation of the load plane, enabling the roll and pitch rotation. Finally, the lower part of the actuators (8") is attached to the platform by means of a connection with a single axis of rotation (75).

The invention claimed is:

1. A machine, for simulating movement produced during transport, that can be applied to simulate how products and/or packaging behave, comprising a load platform, on which objects, packages or palletized loads to be tested are placed, wherein a lower part of said platform has attached thereto a plurality of upper spherical ball joints with an approximate ±30° rotation angle, coplanar with the axis of rotation of a rotating support, and a lower platform, which is located opposite the load platform and which is provided with anchors for attachment to a vertical vibration table, and wherein a counterweight configured to maintain the center of mass in the central axis of the machine is located on the lower platform; additionally, a central support, connecting both platforms, is located between the load platform and the lower platform and, furthermore, a plurality of mutually independent hydraulic servo-actuators, configured to generate the pitch and roll movement of the upper load platform are integrally attached between the upper spherical ball joints with a ±30° rotation angle, and lower spherical ball joints with a ±15° rotation angle; said servo-actuators being further arranged along two perpendicular planes that pass through the center of the rotating support forming a 90° angle.

2. The machine according to claim 1 wherein a plurality of pneumatic, hydraulic or electrical actuators are integrated into safety, locking and self-levelling means of the platform on the lower platform and integrally attached thereto, being configured to maneuver the objects, packages or palletized loads on the load platform when there is no hydraulic pressure in the hydraulic servo-actuators.

3. The machine according to claim 1 wherein stiffening means which comprise at least a plurality of low-friction bushings are integrally attached to a plurality of stiffening plates and a plurality of cylinders are attached to the platform of the vertical vibration table, and wherein said stiffening means are configured to reduce the torque that supports the hydraulic servo-actuator of the vertical vibration table on which the machine is installed.

4. The machine according to claim 1 wherein an inertial measurement unit configured to measure the pitch and roll of the objects, packages or palletized loads is integrally connected to the load platform.

5. The machine according to claim 1 wherein the rotating support is a gimbal configured to support the weight of the objects, packages or palletized loads and to maintain the center of rotation of a load plane of the load platform, enabling the roll and pitch movement, while limiting its rotation.

6. The machine according to claim 1 wherein the mutually independent hydraulic servo-actuators generate the pitch and roll movement of the upper load platform being arranged at a 90° angle, and which comprise comprise upper and lower spherical ball joints, while a gimbal supports the weight of the objects, packages or palletized loads and maintains the center of rotation of a load plane of the load platform enabling the roll and pitch movement, while limiting its rotation.

7. The machine according to claim 1 wherein the actuators comprise a ball joint, coplanar with the center of a central spherical ball joint on its upper part, that supports the weight of the objects, packages or palletized loads and maintains the center of rotation of a load plane of the load platform, enabling the roll and pitch movement, and wherein a lower part of the actuators is attached to the load platform by means of a connection with a single axis of rotation.

8. Use of the machine of claim 1 for testing of packaging.

* * * * *